Patented Aug. 20, 1940

2,212,314

UNITED STATES PATENT OFFICE 2,212,314

WATER RESISTANT AMYLACEOUS COMPOSITIONS

Jordan V. Bauer, Chicago, and Don M. Hawley, Geneva, Ill., assignors to Stein, Hall Manufacturing Company, Chicago, Ill., a corporation of Delaware No Drawing. Application August 18, 1937, Serial No. 159,712

12 Claims. (Cl. 260—9)

This invention relates to water-resistant compositions made by a reaction utilizing amylaceous substances and formaldehyde. The term "amylaceous" is used to cover both starches and dextrines.

Amylaceous compositions made from starches and dextrines are normally more or less soluble in water. Thus, it is possible to gelatinize starches by cooking them with water and thereby produce a gelatinous composition. Such a composition, however, when applied to paper, wood, fabrics and similar materials, is neither water-resistant nor water-proof but readily dissolves. Up to the present time no satisfactory method has been devised for preparing water-resistant or water-proof amylaceous film-forming coating and impregnating compositions.

Formaldehyde has been rather widely suggested as a toughening or hardening agent for cellulose, for instance, in the paper and textile industries. As is well known, it has a disinfecting action, and for this reason has been added in small quantities to a large number of widely varied compositions. The use of formaldehyde as such, however, leaves much to be desired, because of its irritating action. At ordinary temperatures and pressures it exists as a gas but is usually sold commercially in aqueous solution of about 30% to 40% concentration, having a specific gravity of about .75 to .81.

For some years it has been known that formaldehyde reacts in some way with starches. In fact, it is believed that formaldehyde has a definite relationship to the starch structure (see Eynon and Lane, "Starch, Its Chemistry, Technology and Uses" page 5 (1928)). When used in relatively large quantities it will gelatinize starch.

Reference is hereby made to the following patents as illustrating the state of the art: Classen, 602,697, Herstein, 982,673, Bergquist, 1,287,841 and Beyer, 1,983,732.

Classen reacts formaldehyde with starch and claims to produce compositions which, if heated with dilute acids or alkalis are decomposed, formaldehyde being given off. Primarily Classen is interested in the gradual liberation of formaldehyde as an antiseptic, while the starch or starch-like bodies are absorbed by wounds.

Herstein and Bergquist both describe the treatment of starch with formaldehyde and ammonium compounds in sufficient quantities to form hexamethylene tetramine. Herstein claims to produce an insoluble non-gelatinizable starch, while Bergquist, by using smaller amounts of hexamethylene tetramine, claims to produce a starch adhesive in which the starch will gelatinize.

Beyer indicates that a rubber-like material may be prepared by a heat and pressure treatment of starch and formaldehyde in the presence of a catalyst, preferably metallic magnesium.

One of the objects of the present invention is to produce compositions which will form self-sustaining films when dried and which may be coated or impregnated on or into surfaces of all types, and especially fibrous materials such as paper, wood, fabrics and the like, yielding water-resistant or water-proof materials. A further object is the preparation of film-forming compositions of the character above described which form water-resistant or water-proof films when applied to the surface of an object and allowed to dry normally without heating. Another object is the provision of a new and improved method for producing compositions of the character described. Other objects will appear hereinafter.

In accomplishing these objects in accordance with this invention, we have found that compositions which may be readily flowed or spread into films may be prepared by a reaction between an amylaceous substance, formaldehyde and an acid, the amylaceous substance forming the major proportion of the composition and the reaction preferably being effected in water. By employing relatively large amount of formaldehyde and strong acids, we were able to obtain compositions which yield clear water-resistant films when dried in the air without heating. With smaller proportions of formaldehyde and with weaker acids or salts which yield acids on heating in the presence of water, the water-resistance is decreased and films of suitable water-proof character and hardness are not obtained merely by air drying. Under such conditions, however, we may still obtain water-resistant films by subsequently heating the film to an elevated temperature of about 100° C. or higher.

We have further found that by carrying out the reaction under modified conditions with or without the addition of certain auxiliary materials, we were able to decrease the amount of formaldehyde required and still obtain air dried films of suitable water-resistance and hardness. One such modification involves the addition of the formaldehyde to the amylaceous substance in a relatively dry state. That is to say, an aqueous solution of formaldehyde is blended with the amylaceous substance with the addition of no more water than required to give a crumbly appearance, or the amylaceous substance may be mixed with a solid derivative of formaldehyde such as para-formaldehyde. This mixing may take place at ordinary temperatures, and the resultant material dried to a powder. Some reaction apparently takes place, but not enough to produce a film-forming composition. Thereafter, it is cooked with water and an acid, and a film-forming composition is produced. Another modification consists in adding the ingredients in relatively small quantities with thorough mixing between each addition. Acid tends to hydrolyze starch, and hence, should preferably not be added until after the other ingredients. Such hydrolysis forms sugars which are apparently detrimental to the compositions in that they reduce the water-resistance of the film.

The type of acids used may vary rather widely, but strong mineral acids such as hydrochloric, sulphuric, nitric and phosphoric, or strong organic acids such as the aromatic sulfonic acids are preferably employed. The latter type of acid appears to have less darkening effect on the starch.

It has been discovered that the addition of small amounts of urea greatly facilitates the reaction and permits a reduction in the quantity of formaldehyde necessary to obtain films which are rendered water-proof by air drying without heating. The action of the urea is not known, but the amounts required are much less than those which would normally react with the formaldehyde to produce urea resins.

The invention will be further illustrated, but is not limited by the following examples in which the quantities are stated in parts by weight, unless otherwise indicated:

EXAMPLE I

An amylaceous composition was prepared by mixing together about 120 parts of 40% formaldehyde solution, 100 parts of a corn starch dextrine, approximately 90% soluble in water, and about 4.5 parts of concentrated nitric acid. The acid was added after the dextrine and formaldehyde had been mixed together. In both instances, the mixing was carried out at ordinary temperatures. A film of the resultant composition painted on paper, wood and similar materials is very water-resistant and fairly hard. Its hardness may be increased by oven drying, for instance, at 100° C. for about a half hour.

The following example illustrates the result obtained by using the same type of dextrine with large amounts of formaldehyde, as in Example I, but with a different type of acid and also using heat in carrying out the reaction.

EXAMPLE II

In this example, 100 parts of a corn starch dextrine, approximately 90% soluble in water, was mixed with about 120 parts of 40% formaldehyde solution and 5 parts of benzene sulfonic acid added. This mixture was cooked to 190° F. in a period less than five minutes while stirring and cooling to 75° F. The oven dried film on paper showed good water-resistance after drying a half hour at 100° C. It was very hard and difficult to scratch. The air dried film at the end of one hour was slightly water-resistant. At the end of two hours it was more water-resistant, and was even better water-resistant at the end of three hours. After standing for several days it was very hard and very water-resistant.

The following example shows the effect of decreasing the proportion of formaldehyde:

EXAMPLE III

In this example, 100 parts of corn dextrine, approximately 90% soluble, were mixed with 200 parts of water and about 16 parts of 40% formaldehyde solution. The mixture was cooked together at 190° F., cooled to 75° F. and 10 parts of 10% nitric acid added. Films of the resultant composition on paper, wood and similar materials, when oven dried at 80° to 100° C. for thirty minutes, showed good water-resistance. Air dried films, however, did not possess suitable water-resistance.

The following example illustrates the result obtained by using relatively large amounts of formaldehyde with an acid salt rather than a strong acid.

EXAMPLE IV

In this example, 100 parts of corn dextrine, 90% soluble, were mixed with about 120 parts of 40% formaldehyde solution and 5 parts of aluminum sulphate at ordinary temperatures. Films of the resultant material on paper, wood and similar materials showed good water-resistance when oven dried as described in Example III, but the air dried films did not show suitable water-resistance.

The following example shows that with relatively large amounts of formaldehyde, excellent results are obtained by adding relatively small amounts of urea, even though the composition is prepared at ordinary temperatures.

EXAMPLE V

In this example, 100 parts of corn dextrine, 90% soluble, were mixed with about 120 parts of 40% formaldehyde solution, 2 parts of urea and 5 parts of benzene sulfonic acid at ordinary temperatures. When a uniform homogeneous dispersion had been obtained, it was painted on paper, wood and similar materials and tested as previously described. Both oven dried and air dried films exhibited good water-resistance and suitable hardness. The use of relatively large quantities of urea apparently softens the film.

The following example is given to illustrate a modification in which smaller proportions of formaldehyde are employed by adding the amylaceous material at intervals.

EXAMPLE VI

In this example, 100 parts of water were mixed with about 40 parts of 40% formaldehyde solution and 2 parts of benzene sulfonic acid. The mixture was heated to about 190° F. and a corn dextrine, about 90% soluble, was added in 5 to 10 part portions at 3 to 5 minute intervals until 100 parts had been added. The mixture was then cooked to 75° F. Films of the resultant composition on paper, wood and similar materials, when oven dried, were insoluble. Air dried films showed fair water resistance.

EXAMPLE VII

In this example, 100 parts of water, about 40 parts of 40% formaldehyde solution and 1 part of toluene sulfonic acid were heated to 190° F. and then mixed thoroughly with 100 parts of corn dextrine, 90% soluble, which was added at the rate of 10 parts every 5 minutes. The air dried film was not insoluble. A further quantity of 2 parts toluene sulfonic acid was then added and on air drying the film showed some water-resistance. With a further addition of 1 part urea, a very good film on paper was obtained after air drying one hour. The composition set up to form a gel on standing, which became fluid on heating. This gel composition, when diluted with 50 cc. of water and heated to form a homogeneous mixture produced films on paper, glass, wood and similar materials, having good water-resistance. A repetition of this example with larger quantities of materials showed similar results.

Example VIII

In this example, 50 parts of a chlorinated corn starch, sold under the trade name of "Hercules" starch, were mixed with 10 parts of water and 5 parts urea, which was previously dissolved in the water. The ingredients were mixed at ordinary temperature, some action apparently occurring. Thereafter, 190 parts of water were added and the resultant composition heated at 190° F. for 10 minutes. A mixture of about 40 parts of 40% formaldehyde solution and 4.5 parts of concentrated nitric acid was then added in small portions. The resultant composition produced films on paper, wood, cloth and similar materials which, when air dried one hour, showed good water-resistance and were not readily removed, even by scratching with the fingernail. Repetitions of this example gave similar results.

Example IX

In this example, 100 parts of corn dextrine, 90% soluble, were mixed with 20 parts of water and 5 parts urea at ordinary temperature. Then 80 parts of water were added and the mixture heated at 190° F. for 15 minutes. Thereafter a mixture of about 40 parts of 40% formaldehyde solution and 4.5 parts of concentrated nitric acid was added. The resultant composition produced films which were very insoluble in water on air drying, and quite hard.

Example X

In this example, 50 parts of tapioca dextrine, about 95% soluble in water, 5 parts urea and 50 parts of water were heated to 190° F. in about 5 minutes, and 40 parts of 40% formaldehyde solution added. Heating was continued for 10 minutes and about 4.5 parts of nitric acid were immediately added, forming a thick gel. This gel was diluted with 50 parts of water and heated until a uniform fluid composition had been obtained. Films of this composition on glass, paper, wood, cloth and similar materials were very hard and water-resistant. The amount of urea and the amount of acid may both be decreased somewhat in this example without greatly affecting the result.

The following example illustrates the preparation of a dry intermediate mixture from the starch, formaldehyde and urea in the presence of limited quantities of water.

Example XI

In this example, 2 lbs. of corn starch were blended with 220 cc. of water at ordinary temperatures and 90 grams of urea added. The ingredients were thoroughly mixed for 15 minutes and then 230 grams of para-formaldehyde added, followed by 100 cc. of water. After mixing for 2 hours, the blend was dried in the air to a powder.

Twenty (20) parts of this composition were then heated with 100 parts of water for 10 minutes, and 4.5 parts of concentrated nitric acid added thereafter. When the dry mixture is heated with the water, it does not at first go into solution nor gel, but when the acid is added, a gel is formed which breaks down on further heating. The resultant film-forming composition gives films on paper, wood and similar materials which are very insoluble in water and quite resistant to abrasion. The amount of formaldehyde required by this method may be substantially reduced.

Example XII

In this example, 50 parts of corn starch and 1 part of urea were blended together and then mixed with a solution of 300 parts of water and 40 parts of 40% formaldehyde solution. This mixture was gelatinized by heating to a temperature of 190° F. Thereafter 4.5 parts of nitric acid were added and the resultant mixture heated for 10 minutes. Films made by painting or otherwise coating this composition on paper, glass, cloth, wood and similar materials were quite water-resistant and very hard on air drying.

Additional quantities of urea were added to the composition to determine what the effect might be. Four additions of 1.5 parts of urea each were made to the composition prepared as above described, and after each addition, films of the resultant composition were tested. These films, when air dried, were all very water-resistant and hard.

To one half of the final mixture, 10 parts of borax were added and this composition then heated on a steam bath. It turned yellow and became quite viscous but films made therefrom were still insoluble and quite hard.

Example XIII

In this example, 100 parts of corn dextrine, about 90% soluble, were mixed with 100 parts of water and the mixture cooked to a gelatinous solution. This solution was than coated on paper to form a film which would normally be very soluble and readily removed by water. Over this film was applied a layer of a solution made by mixing together 40 parts of 40% formaldehyde solution and 1 part of benzene sulfonic acid. After this layer had been painted over the dextrine film and allowed to dry in the air for about 2 to 3 hours, the entire film became very water-resistant. This method of first applying an amylaceous coating in gelatinized or gelatinous form and then applying a coating of a solution containing formaldehyde and an acid may be used in the treatment of all types of materials, including paper, wood, cloth and similar materials. Under some circumstances it may be desirable to heat the combined material after one or both coatings have been applied.

The following table will illustrate the relative proportions of the ingredients in the various examples in parts by weight:

*Proportions in parts by weight*

| Example | Starch | Dextrine | HCHO | Urea | Acid | Water |
|---|---|---|---|---|---|---|
| 1 | | 1 | .48 | 0 | .045 | .72 |
| 2 | | 1 | .48 | 0 | .05 | .72 |
| 3 | | 1 | .064 | 0 | .1 | 2.09 |
| 4 | | 1 | .48 | 0 | .05 | .72 |
| 5 | | 1 | .48 | .02 | .05 | .72 |
| 6 | | 1 | .16 | 0 | .02 | 1.24 |
| 7 | | 1 | .16 | .01 | .03 | 1.24 |
| 8 | 1 | | .32 | .10 | .09 | 4.48 |
| 9 | | 1 | .16 | .05 | .045 | 1.24 |
| 10 | | 1 | .32 | .10 | .09 | 1.48 |
| 11 | 1 | | .25 | .10 | .2 | |
| 12 | 1 | | .32 | .02 | .09 | 6.48 |
| 13 | | 1 | .16 | | .01 | 1.24 |

*Range*

| Water | Dextrine | Starch | HCHO | Urea | Acid |
|---|---|---|---|---|---|
| 0.72 to 2.09 | 1 | | .064–.48 | 0–.10 | .02 to .2 |
| 4.48 to 6.48 | | 1 | .25–.32 | .10 | .09 to .2 |

From the foregoing table it will be seen that according to the preferred examples given above, the preferred amount of formaldehyde varies from about 0.064 to about 0.48 part per part of amylaceous material, the amount of urea varies from 0 to about 0.10 part per part of amylaceous material and the amount of acid varies from about 0.02 part to 0.2 part per part of amylaceous material. The amount of water in the case of dextrines as given in the above examples varies from about 0.72 part to 2.09 parts per part of dextrine. For starches, the amount of water varies from about 4.48 parts to about 6.48 parts in the case of the compositions given in the above table.

In a similar manner, coating compositions may be made from starches and dextrines together with urea and water and applied to paper, cloth, wood, or a combination of any of these materials, followed by treatment with a solution of formaldehyde and an acid.

Some variations may be made without departing from the invention. The order of adding the reactants may have an effect upon the results obtained and also the quantities of the various reactants required. Generally speaking, it is preferable that starch be gelatinized before addition of the acid. In adding the formaldehyde, we prefer to add it at a point where it will be present in as concentrated a state as possible. Thus, as illustrated in some of the examples given above, we may add formaldehyde in the initial stages of the process in the presence of quantities of water insufficient to form a liquid dispersion or suspension. Where para-formaldehyde is employed, we normally use it on an equal weight basis with formaldehyde. The invention is not limited to any particular type of starch or dextrine. Among the starches and dextrines which may be employed are those derived from wheat, rye, barley, oats, rice, maize, potatoes, sago and cassava.

Dextrines have some advantages over starches in that they have lower water requirements and hence, when the reactants are all mixed together, there is less dilution. Dilution may be avoided in the case of the starches, however, by blending starch containing its normal moisture content with urea and/or formaldehyde in the initial stages of the process as described in some of the examples. Another method involves adding one or more of the reactants in small amounts.

Inasmuch as the compositions prepared in accordance with the invention are water-resistant or potentially water-resistant, they have a wide variety of uses. They may be formed into self-sustaining films by any convenient method, producing clear or translucent films similar to those obtained from regenerated cellulose. The compositions may be plasticized by adding sulfonated oils, glycerine, diethylene gylcol, camphor and other plasticizers, preferably plasticizers which are somewhat water soluble. Urea, its analogues and homologues, including thiourea, have somewhat of a softening or plasticizing action and may be incorporated at any stage in the preparation of the compositions. Urea also appears to have some action on starches and dextrines.

For some purposes fillers may be included in the compositions, preferably in quantities less than 50% by weight of the total composition. Among such fillers may be mentioned yellow ochre, lithopone, clay, fuller's earth, titanium oxide pigments and similar materials. Thus, a water-proof paint may be obtained by mixing about 40% titanium oxide pigment with any one of the compositions described in the previous examples having a suitable viscosity to produce a film of the desired thickness.

Compositions of the character above described may be used as such in coating or impregnating all types of paper, including kraft papers, laminated kraft papers and paper board. Usually they are applied by surface coating, although they may be added during the manufacture, as for instance, in the paper beater on the Fourdinier wire, or in other stages of the paper making process. The compositions herein described may also be employed to coat all types of cloth, including cotton, woolen, rayon and cellulose acetate fibers and fabrics. They may likewise be used to coat the non-adhesive side of adhesive tape, or either side of laminated paper to cloth combinations. In making corrugated board they may be applied either to the board as a coating, or impregnating composition, or they may be incorporated into the adhesive. In making certain types of water-proof laminated papers where asphalt glues are now used, they may be substituted in whole or in part for the asphalt.

One of the most promising fields is the wrapping of butter and other materials where greaseproof, as well as waterproof, characteristics are desirable. The dried films formed from compositions of the present invention are insoluble in most organic solvents such as oils, greases, acetone, chloroform and the like, and therefore, are substantially resistant to such materials. This is not true of lacquer-coated regenerated cellulose which, although it has moisture-proof characteristics, cannot be used in wrapping butter and similar articles because the lacquer coating tends to float away.

Having thus described the invention, what we claim as new and desire to secure by Letters Patent of the United States is:

1. In the art of preparing water resistant amylaceous coating compositions, the step which comprises reacting together a major proportion of an amylaceous substance, a minor proportion of a formaldehyde compound and a minor proportion of an acid reacting substance in water, the amount of formaldehyde compound corresponding to about 0.06 to about 0.48 part per part of amylaceous substance and the amount of acid reacting compound corresponding to about 0.02 to about 0.2 part per part of amylaceous substance, said reaction being carried out at temperatures up to about 190° F. sufficient to gelatinize and disperse said amylaceous substance, the reaction product being a gelatinous dispersion that dries to a hard, tenacious, water resistant, uniform film when applied as a coating composition.

2. In the art of preparing water resistant materials, the steps which comprise, reacting an amylaceous substance with formaldehyde and an acid in water, the amount of formaldehyde corresponding to about 0.06 to about 0.48 part per part of amylaceous substance and the amount of acid corresponding to about 0.02 to about 0.2 part per part of amylaceous substance, said reaction being effected at temperatures up to about 190° F. sufficient to gelatinize and disperse said amylaceous substance, the reaction product being a gelatinous dispersion that dries to a hard, tenacious, water resistant, uniform film when applied as a coating composition.

3. In the art of preparing water resistant amylaceous compositions, the steps which comprise, heating together a major proportion of an amylaceous substance and a minor proportion of formaldehyde in the presence of water, thereafter adding an acid reacting substance and continuing the reaction, the proportions of materials corresponding to about 0.06 to about 0.48 part of formaldehyde per part of amylaceous substance and to about 0.02 part of acid per part of amylaceous substance, said reaction being carried out at temperatures up to about 190° F. sufficient to gelatinize and disperse said amylaceous substance, the reaction product being a gelatinous dispersion that dries to a hard, tenacious, water resistant, uniform film when applied as a coating composition.

4. In the art of preparing water resistant amylaceous compositions, the steps which comprise, partially gelatinizing a major proportion of a starchy substance with a relatively small amount of urea in the presence of water, blending formaldehyde therewith while still retaining the mixture in substantially solid form, thereafter adding an acid reacting substance and water and heating the mixture to temperatures up to about 190° F. sufficient to gelatinize and disperse the starch, said substances being reacted in proportions corresponding to about 0.06 to about 0.48 part of formaldehyde per part of starchy substance, up to 0.10 part of urea per part of starchy substance and from about 0.02 to about 0.2 part of acid reacting substance per part of starchy substance, the resultant product being a gelatinous composition that dries to a hard, tenacious, water resistant, uniform film when applied as a coating composition.

5. A reaction product of an amylaceous substance, a formaldehyde compound and an acid reacting substance, said product containing the amylaceous substance as the predominant ingredient therein, the proportions of said reacted substances corresponding to about 0.06 to about 0.48 part of formaldehyde per part of amylaceous substance and from about 0.02 to about 0.2 part of acid reacting substance per part of amylaceous substance, said product being obtained by heating the reacting substances at a gelatinization and dispersion temperature of the amylaceous substance up to about 190° F., the product forming a gelatinous dispersion in water capable of being applied as a coating composition and having the property when dried on a material coated therewith of forming a hard, tenacious, water resistant, uniform film.

6. A reaction product of an amylaceous substance, a formaldehyde compound, urea and an acid reacting substance, said product containing the amylaceous substance as the predominant ingredient, the proportions of said substances corresponding to about 0.06 to about 0.48 part of formaldehyde compound per part of amylaceous substance, up to about 0.10 part of urea per part of amylaceous substance and about 0.02 to about 0.2 part of acid reacting substance per part of amylaceous substance, the proportion of urea and acid reacting substance being a minor proportion as compared with the amount of formaldehyde, said substances being reacted at a gelatinization and dispersion temperature of the amylaceous substance up to about 190° F., the resultant product being dispersible in water to form a gelatinous dispersion capable of being applied as a coating composition and having the property when dried on a material coated therewith of forming a hard, tenacious, water resistant, uniform film.

7. An aqueous gelatinous coating composition comprising a reaction product of an amylaceous substance, formaldehyde, urea and an acid reacting substance, said substances being reacted in proportions corresponding to about 0.06 to about 0.48 part of formaldehyde per part of amylaceous substance, 0 to about 0.10 part of urea per part of amylaceous substance and about 0.02 to about 0.2 part of acid reacting substance per part of amylaceous substance, the reaction being effected at a gelatinization and dispersion temperature of the amylaceous substance up to about 190° F., the resultant product being a gelatinous dispersion capable of forming hard, tenacious, water resistant, uniform films when applied as a coating composition.

8. A coating and impregnating composition comprising a reaction product of a dextrine, formaldehyde, urea and an acid reacting substance, said substances being reacted in proportions corresponding to about 0.06 to about 0.48 part of formaldehyde per part of dextrine, 0 to 0.10 part of urea per part of dextrine and about 0.02 to about 0.2 part of acid reacting substance per part of dextrine, said substances being reacted at dextrine dispersion temperatures up to about 190° F., the resultant product being a gelatinous dispersion that dries to a hard, tenacious, water resistant, uniform film when applied as a coating composition.

9. An article rendered water resistant by application thereto of a reaction product of a major proportion of an amylaceous substance but a minor proportion of formaldehyde and a minor proportion of acid, proportions of said substances corresponding to about 0.06 to about 0.48 part of formaldehyde per part of amylaceous substance and from about 0.02 to about 0.2 part of acid reacting substance per part of amylaceous substance, said substances being reacted in water at an amylaceous gelatinization and dispersion temperature up to about 190° F., the resultant gelatinous dispersion drying to a hard, tenacious, water resistant, uniform film when applied as a coating to said article.

10. Paper having thereon a flexible, tenacious coating of a composition comprising a reaction product of a major proportion of an amylaceous substance, a minor proportion of a formaldehyde compound and a minor proportion of an acid reacting substance, the proportions of said substances corresponding to about 0.06 to about 0.48 part of formaldehyde compound per part of amylaceous substance and from about 0.02 to about 0.2 part of acid reacting substance per part of amylaceous substance, said substances being reacted at a gelatinization and dispersion temperature for the amylaceous substance up to about 190° F., the resultant product being soluble and dispersible in water and drying to a hard, tenacious, water resistant, uniform film after being applied to the paper.

11. Paper containing a tenacious, water resistant coating of a composition comprising a reaction product of an amylaceous substance, formaldehyde, urea and an acid, the proportions of said materials being within the range of about 0.06 to about 0.48 part of formaldehyde per part of amylaceous material, 0 to about 0.10 part of urea per part of amylaceous material and 0.02 to about 0.2 part of acid reacting substance per part of amylaceous material, said substances being reacted at an amylaceous gelatinization and dispersion temperature up to about 190° F. and the reaction product drying to a hard, tenacious, water resistant, uniform film after being applied to the paper.

12. Paper containing a tenacious, water resistant coating of a composition comprising a reaction product of a dextrine, formaldehyde, urea and an acid, the proportions of said materials being within the range of about 0.06 to about 0.48 part of formaldehyde per part of dextrine, 0 to 0.10 part of urea per part of amylaceous material and 0.02 to about 0.2 part of acid reacting substance per part of amylaceous material, said substances being reacted at an amylaceous gelatinization and dispersion temperature up to about 190° F. and the reaction product drying to a hard, tenacious, water resistant, uniform film after being applied to the paper.

JORDAN V. BAUER.
DON M. HAWLEY.